Sept. 26, 1967

J. BAUDE 3,344,282

VOLTAGE LEVEL SENSING MEANS FOR STANDBY
POWER SUPPLY SYSTEMS

Filed April 6, 1964

Inventor
John Baude
By R. J. Falkowski
Attorney

Inventor
John Baude

United States Patent Office 3,344,282
Patented Sept. 26, 1967

3,344,282
VOLTAGE LEVEL SENSING MEANS FOR
STANDBY POWER SUPPLY SYSTEMS
John Baude, Milwaukee, Wis., assignor to Allis-Chalmers
Manufacturing Company, Milwaukee, Wis.
Filed Apr. 6, 1964, Ser. No. 357,688
11 Claims. (Cl. 307—66)

Reference is hereby made to my copending application, Ser. No. 282,529, AC Standby Power Supply System, filed May 13, 1963, for purposes of obtaining the benefit of the filing date in accordance with 35 U.S.C. 120.

This invention relates to power inverter systems that are utilized as AC standby power supply systems to furnish alternating current power to a load in the event of failure of the normal or primary AC supply. Particularly it relates to the means provided to effect switching between the primary source to the standby source in response to the primary source level.

In many applications using alternating current to supply a load, it is often necessary, or at least highly desirable, to provide means for supplying alternating current power if the primary power source fails. This need has led to the development of AC standby power supply systems that operate from an alternate source of power. A common alternate source of power is a battery because it is reliable and continuously available without requiring much maintenance or observation.

In utilizing a battery to furnish the alternate emergency power supply to an AC load, three basic systems are available.

The first system operates a power inverter continuously from the battery to supply the load and uses a battery charger to maintain the charge level of the battery. In the event of failure of the alternating current power supply the inverter keeps operating until the battery discharges to a point too low to supply the power requirements of the load.

The second system also operates a power inverter continuously but relies upon a rectifier for furnishing power to the inverter. A battery is used to furnish power upon failure of the alternating current power source.

The third system connects the alternating current supply directly to the load and has the battery and power inverter in a separate circuit. Additional circuitry is connected to the AC power supply to sense the power being furnished. In the event of failure of the AC power source it disconnects the normal AC power supply and connects the load to the inverter which then operates from the power furnished by the battery.

This invention is utilized with the third general scheme and is directed toward means for sensing the level of the primary AC source to determine when the instantaneous voltage level of the primary source has dropped below a predetermined level. Means are further provided to effect switching the load from the primary AC source to the standby source when the primary AC source fails and back again when the primary AC source is restored. The switching in either direction is accomplished without any phase shift appearing at the load.

The objects of this invention are: to provide a new and improved AC standby power supply system; to provide an AC standby power supply system that is highly reliable and requires little maintenance; to provide a standby system that is flexible in design and application; to provide a standby system that can switch from normal to standby and back to normal power without any phase shift appearing at the load; to provide a standby system that compares the level of the AC power source to a selected reference signal to determine the level of the AC power source; to provide a standby system that provides AC power to a load instantaneously and automatically upon failure of the normal power supply; and to provide a standby system that can be adjusted to select the level of failure of the primary AC source that will effect the switching over to standby power.

Advantages and other objects will appear from the detailed description of the invention.

Figure 2:
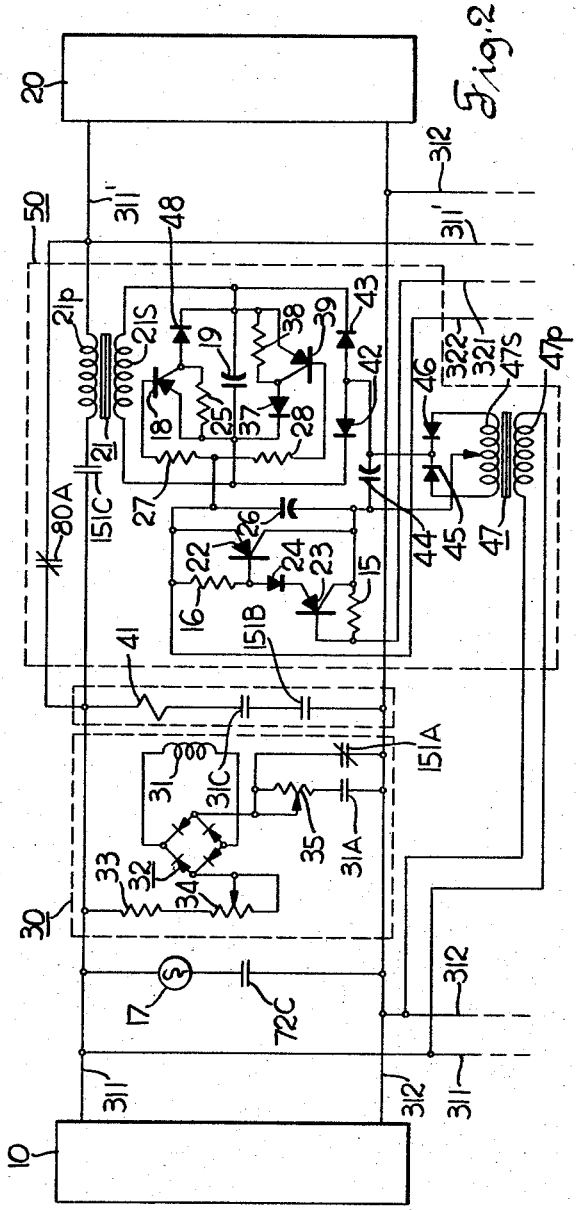
FIG. 2 is a schematic drawing of an embodiment of a portion of a circuit embodying this invention.
Figure 3:
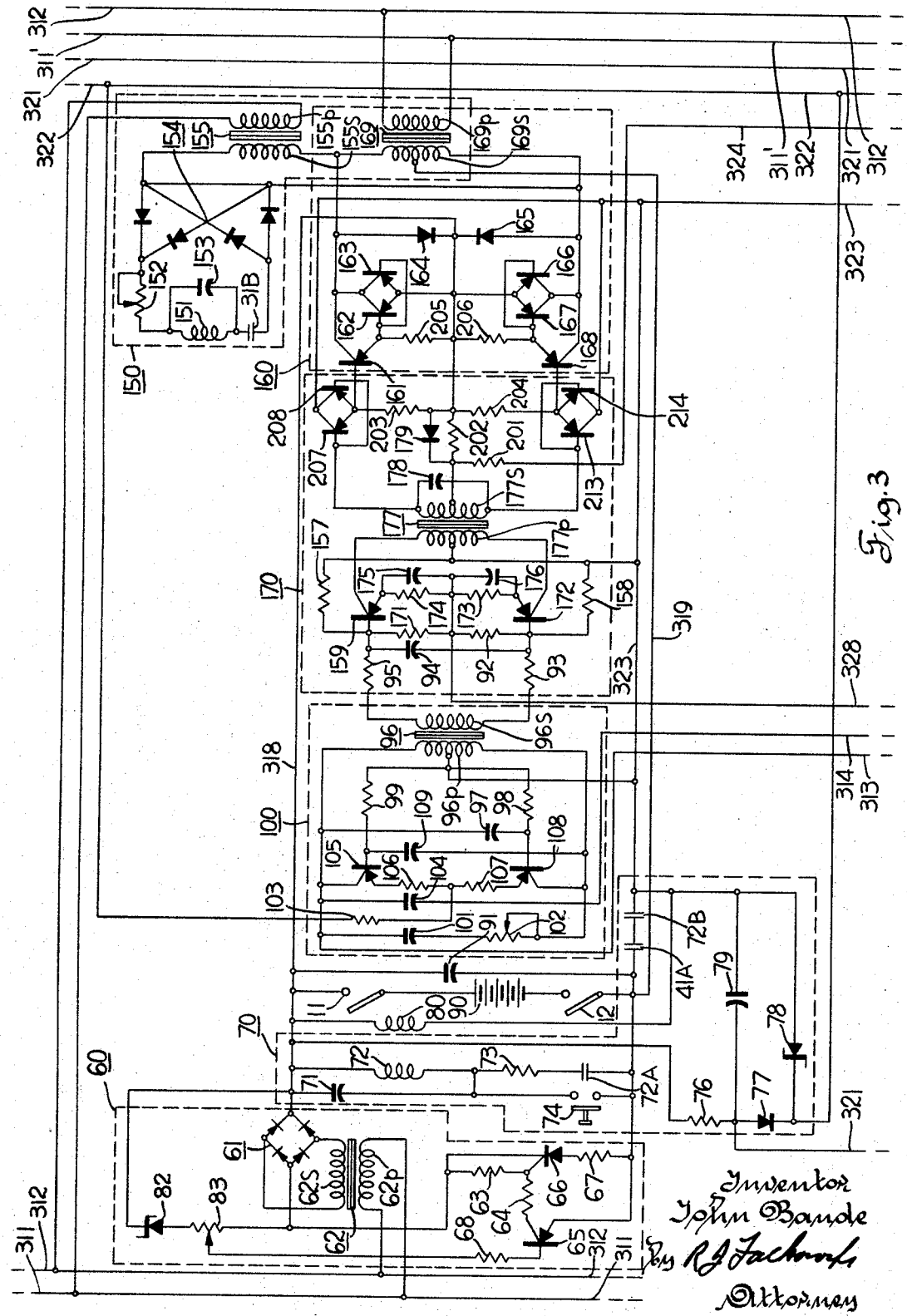
FIG. 3 is a schematic drawing of an embodiment of a portion of a circuit embodying this invention.
Figure 4:
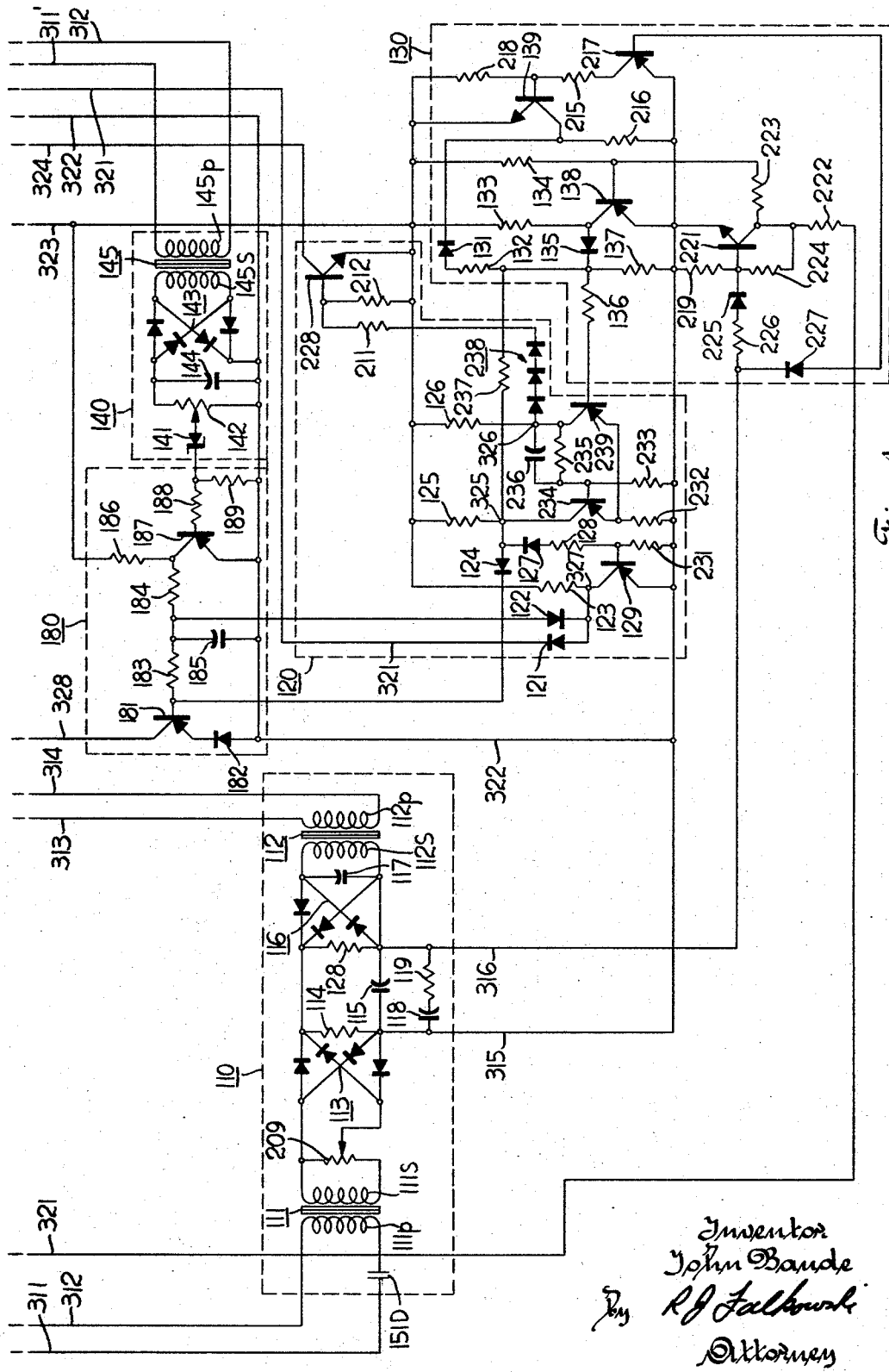
FIG. 4 is a schematic drawing of an embodiment of another portion of a circuit embodying this invention.

Referring to FIGS. 2, 3 and 4, a primary AC power source 10 is connected to a load 20 through a switch circuit 50. A DC source comprising a battery 90 and a battery charger 60 (FIG. 3) is provided to furnish power upon failure of AC power source 10.

Static output means are provided to produce the necessary power from the DC source upon failure of the AC power source. The static output means comprises power means for inverting the DC power and output control means for controlling the power means to maintain a power means output of sufficient power to properly operate the load.

The output control means, which comprises an output sensing circuit 140 and a driver control circuit 180, is connected to load 20 to continuously sense the current flow through the load so that upon switching from the AC power source to the DC source the required power will be instantly furnished at the desired level.

The power means comprises an inverter circuit 160 and a driver circuit 170 for controlling the inverter circuit.

A control means is provided for sensing the condition of the AC power source and for controlling the standby system to supply the load from the primary AC power source or from the DC source in response to the conditions of the primary AC power source and DC source. The control means comprises switching means, reference signal means, synchronizing means, voltage sensing means and protection means.

The switching means, which comprises switch circuit 50 and a bypass relay 80, is provided for connecting or disconnecting the AC power source from the load, and is controlled by other portions of the control means.

The reference signal means, which comprises an oscillator circuit 100, is provided for producing a reference signal of predetermined amplitude and wave shape that is compared to the AC power source output to determine the condition or voltage of the AC power source. The reference signal is of a controlled frequency and is used as a control frequency for the AC power produced by inverter circuit 160.

The oscillator is tuned to have a slightly different frequency from the AC power source. Thus, when the AC power source is restored, the switching of the load back to the AC power source is selected to occur at the precise moment the AC power source and the inverter are in phase.

The synchronizing means is provided for synchronizing the AC power source output and the inverter output when switching from one power source to the other. The synchronizing means comprises a reference phasing control means and a phase synchronizing means.

Figure 5:
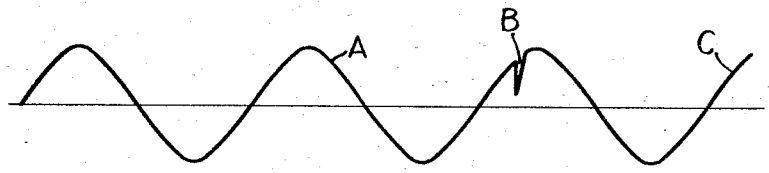
FIGS. 5, 6, 7 and 8 show wave forms appearing in various parts of the circuitry of the system.

The reference phasing control means provides for synchronization when switching from the AC power source to the DC source. This is accomplished by connecting the AC power source to control the oscillator frequency and somewhat by feeding back power from the load through inverter 160 to oscillator 100. Thus, when the inverter is energized to supply AC power to the load and the AC power source is disconnected from the load, the inverter output is at this instant in phase with the AC power source. The power that is delivered to the load will be practically continuous. This is shown in FIG. 5 where curve A is the AC power source output, point B is the point where switching to the DC source occurs, and curve C is the output of the inverter. The reference phasing control means becomes inoperative after switchover to inverter power and the tuned frequency of the oscillator controls the frequency of the inverter AC power. Therefore, curve C is of a slightly different frequency than curve A.

The phase synchronizing means, which comprises synchronizing circuit 150, is provided for switching the load from the inverter output to the AC source when they are in phase. Since the tuned frequency of the oscillator, and therefore the frequency of the inverter output, is slightly different from the frequency of the power source, the two frequencies will coincide in phase angle relationship within a short period of time after restoration of the AC power source. The phase synchronizing means responds to the phase relationship to effect the connection thereby restoring the standby system to a standby status. The system is then again ready to switch back to operation from the DC source if the AC power source should again fail.

The voltage sensing means is provided for sensing the condition of the AC power source output to effect energizing of the load from the DC source when the AC power source output drops to a predetermined level. The voltage sensing means comprises an instantaneous voltage comparison means and a voltage level sensing means.

The instantaneous voltage comparison means is provided for substantially instantaneously sensing a deviation in the wave form of the AC power source output. The instantaneous voltage comparison means comprises a voltage comparison circuit 110, a pulse circuit 130, and a voltage sensing control circuit 120.

Figure 6:
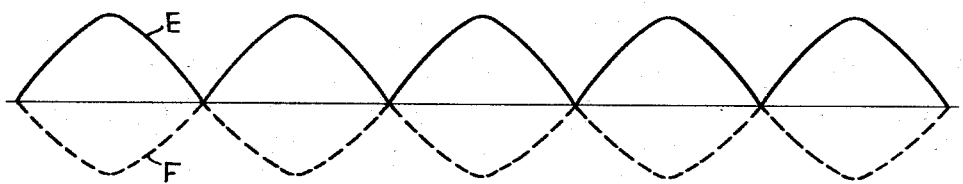
Figure 7:
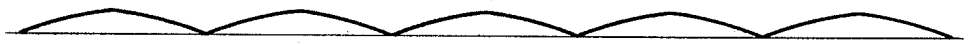

Voltage comparison circuit 110 receives a measure of the AC power source output and the reference signal and compares them to produce an output varying as a function of the AC power source and the reference signal. By selecting the amplitude and wave shape of the reference signal, the output of the voltage comparison circuit can be selected to indicate an instant deviation from the desired wave form. Normally, an instantaneous drop of the AC power source voltage below a predetermined level is sensed to produce a voltage comparison circuit output reflecting the amount of this drop. FIG. 6 shows how the AC power source output and the reference signal are compared with curve E being the AC power source signal and curve F the reference signal. FIG. 7 shows a resultant output from the voltage comparison circuit.

Figure 8:

Pulse circuit 130 responds to the voltage comparison circuit output to produce pulses of one polarity when the AC power source is at the required voltage within preselected limits as shown in FIG. 8; and to produce pulses of an opposite polarity when the voltage of the power source is not of the required voltage.

Voltage sensing control circuit 120 responds to the polarity of the pulses of the pulse circuit to effect switching of the switching means and to control the energization of the output means by the DC source.

The voltage level sensing means, which comprises a relay circuit 30, is provided for more slowly responding to a continuous predetermined low voltage of the AC power source output. The level is selected to be higher than the instantaneous level that would affect the instantaneous voltage comparison means.

Thus, the voltage sensing means responds to an instantaneous voltage drop that would adversely affect the load and also responds to a lesser voltage drop that would adversely affect the load only if it continued for a predetermined longer period of time.

The protection means, which comprises a battery disconnect circuit 70 and a timing means 40, is provided for making the standby system inoperative if the battery voltage is below a predetermined level. This prevents abnormal operation that could result from supplying load power from a weak DC source and also prevents complete discharge of the battery.

Battery disconnect circuit 70 responds to a predetermined minimum voltage level of the battery to open switch circuit 50 through the operation of a bypass relay contact 80A of bypass relay 80. At the same time the battery is disconnected from the remainder of the standby system to prevent further discharge of the battery.

Timing means 40 is provided to similarly connect the AC power source to the load and disconnect the battery from the rest of the system after a predetermined continuous interval of energization of the load from the DC source. The interval may be selected to prevent excessive discharging of the battery when the time required for load operation after failure is known. For example, the load may be emergency equipment used to switch in alternate power sources and the need for energizing may end after a short interval. In this case it would be advisable to disconnect the battery after these functions are completed rather than allow the standby system to operate until the battery voltage drops sufficiently to affect battery disconnect circuit 70.

Means are provided by a battery charger 60 for maintaining the battery at its full charge. Battery charger 60 receives AC power from the AC source along conductors 311 and 312 at a primary winding 62p of a transformer 62. A secondary winding 62s produces an output which is rectified by a full wave rectifier 61. The rectified power is applied to battery 90 through a silicon controlled rectifier 66 that is triggered into conduction by a transistor 65 across a resistor 64 when battery voltage falls below the adjusted voltage of a zener diode 82. A resistor 67 is connected in series with SCR 66 to limit the charging current pulses to a predetermined maximum. A resistor 63 keeps SCR 66 turned off when transistor 65 is turned off. An adjustable resistor 83 permits small deviations from the voltage rating of zener diode 82. Transistor 65 is turned on at a level determined by a bias resistor 68.

In the following description of the circuitry the operation of the standby system shall be called "normal" when the load is being powered by AC power source 10 and the opreation shall be called "emergency" when the load is being powered by battery 90.

Upon turning on the system for normal operation, relay circuit 30 (FIG. 2) receives power from AC power source 10 along conductors 311 and 312 and activates synchronizing circuit 150 (FIG. 3) which operates to place the standby system in a readiness condition. Battery 90 is connected into the circuitry and supplies power to oscillator circuit 100. The oscillator circuit is then ready to provide power for the operation of other portions of the system and also provides a reference signal of a predetermined level and wave shape. The reference signal is conducted along oscillator conductors 313 and 314 to voltage comparison circuit 110 (FIG. 4).

Voltage comparison circuit 110 receives this reference signal and also receives the AC power source output along conductors 311 and 312 and compares the AC power source output to the reference signal. Voltage comparison circuit 110 then furnishes a resultant output along sensing conductors 315 and 316 to pulse circuit 130. Pulse circuit 130 analyzes the output from voltage comparison circuit 110 and supplies this information to voltage sensing control circuit 120. Voltage sensing control circuit 120 produces an output that indicates to the remainder of the circuitry that the condition is one of normal operation (or emergency operation).

During normal operation the remainder of the circuitry is not activated. During emergency operation voltage sensing control circuit 120 energizes drive circuit 170 by connecting it to the battery. At the same time driver control circuit 180 and inverter circuit 160 are energized and brought under control of output sensing circuit 140. Also, AC power source 10 is disconnected from the load through switch circuit 50 and the load is powered along conductors 311′ and 312 by inverter circuit 160. The changeover from the AC power source to the DC source supplying AC power is very rapid and takes less than one-half millisecond. FIG. 5 shows the wave form of the AC power source output, sine wave A, and the wave form of the power produced by the system, sine wave C, when the AC source fails. The system also attempts to make up for lost time by instantly increasing its voltage output to a point where it would have been if the voltage of the normal AC power source would have been continued at a normal level. This is also shown in FIG. 5 by the sharp drop and rise back to the voltage of the normal sine wave at the changeover point, point B.

Referring to FIGS. 2, 3 and 4, to place the system in standby status (normal operation), AC power from source 10 is applied across terminals 311 and 312. Switches 11 and 12 (adjacent battery 90) are closed to ready the standby system by applying battery potential to conductors 318 and 319. At the instant of connecting the AC power source to conductors 311 and 312 the current flows through normally closed contact 80A and conductors 311 and 311′ to load 20.

Contact 80A is a normally closed contact of bypass relay 80 that opens immediately after a timing relay 41 has operated to close a contact 41A in response to the applied AC power and in response to the closing of switches 11 and 12. Relay 80 is energized to open contact 80A when contact 41A and a contact 72B of a battery disconnect relay 72 are closed. When the battery charge level drops below a predetermined minimum level, contact 72B opens to deenergize bypass relay 80 (thereby closing contact 80A) and to disconnect the battery from the remainder of the circuitry. The system is then inoperative and source 10 is connected to load 20 through contact 80A regardless of the output level or condition of source 10. Timing relay 41 is disconnected from the AC source upon failure of the AC source by the opening of either contact 31C or 151B and after a predetermined period of time opens to make the system inoperative and to convert source 10 to load 20.

When AC power from source 10 is present, power is supplied along conductors 311 and 312 to relay circuit 30. Relay circuit 30 comprises a control relay 31 that has three contacts: contact 31A in relay circuit 30; contact 31B in synchronizing circuit 150, and contact 31C in timing means 40. Control relay 31 receives current through a full wave rectifier 32 from the AC power source. A resistor 33 and a variable resistor 34 are connected in series with the full wave rectifier and upon application of AC power a circuit is completed through the resistors and a normally closed contact 151A of synchronizing relay 151 in synchronizing circuit 150. Upon energization of control relay 31, contact 31A closes and locks in relay 31. When relay 31 is locked in, it then functions as a voltage level sensing device, as explained. A variable resistor 35 is adjusted so that the contacts of control relay 31 opens when the AC power source voltage drops below a certain level. Control relay 31 operates at a comparatively slow rate extending over several cycles.

When control relay 31 is energized it also closes contact 31B in synchronizing circuit 150. Synchronizing circuit 150 comprises a synchronizing relay 151 connected in series with a variable resistor 152, a capacitor 153 connected in parallel with the coil of synchronizing relay 151, a full wave rectifier 154, and a secondary winding 155s of a transformer 155. Synchronizing circuit 150 receives power from AC source 10 through secondary winding 155s of transformer 155 and a secondary winding 169s of a transformer 69. Upon closing of contact 31B synchronizing relay 151 is energized to open its normally closed contact 151A and close its normally open contacts 151B, 151C and 151D, provided voltages of windings 169s and 155s are essentially in phase, as will be later explained.

Contact 151A is located in relay circuit 30 and when opened upon energization of relay 151 places relay circuit 30 in a ready state to sense voltage.

Contact 151B is located in timing means 40 and when closed completes a circuit from the AC power source across timing relay 41. (The other contact in timing circuit 40, contact 31C, has been closed by the activation of control relay 31.) Upon completion of the circuit through timing relay 41, its contact 41A, located in battery disconnect circuit 70, is closed.

Upon energization for normal operation, timing relay 41 operates to close its contact 41 within a very few seconds after AC power source 10 is present and contacts 31C and 151B are closed. The closing of contact 41A connects the battery to conductor 323 if contact 72B is closed.

During emergency operation, timing relay 41 operates after a selected period of time to open its contact 41A to disconnect the battery from conductor 323 and the remainder of the circuitry. This timing operation is optional and is utilized to save the battery from total discharge or to limit its time of operation. In the system shown in the drawings, source 10 is automatically reconnected to load 20 at the end of the timed period (when contact 41A opens) because relay 80 drops out to close contact 80A.

Contact 151C in switch circuit 50, when closed, connects AC power source 10 along conductor 311 through a primary winding 21p of a transformer 21 along conductor 311′ to load 20. The normally closed contact 80A is open during standby (normal) operation because relay 80 is energized.

Contact 151D in voltage sensing circuit 110, when closed, connects a primary winding 111p of a transformer 111 to AC source 10 along conductors 311 and 312.

After application of sufficient AC power to the system, battery 90 is still not connected to the remaining circuitry because contact 72B in battery disconnect circuit 70 is still open. In order to close this contact and connect the battery, a push button switch 74 must be depressed to energize battery disconnect relay 72. This completes a circuit from the negative terminal of the battery, conductor 319, through switch 74 and the coil of battery disconnect relay 72 along conductor 318 to the positive terminal of the battery. This closes contact 72A thereby maintaining the relay in an energized condition with current flowing from the negative terminal of the battery along conductor 319 through contact 72A, resistor 73, and the coil of relay 72 to the positive terminal of the battery along conductor 318. Resistor 73 is selected so that battery disconnect relay 72 will drop out if the battery voltage is below a predetermined level. Therefore, unless the battery is charged to this predetermined minimum level, voltage relay 72 will deenergize when push button switch 74 is opened to open contacts 72A and 72B. Since push button switch 74 is normally open, relay 72 will be deenergized whenever the battery voltage drops below this predetermined minimum level. A capacitor 71 is connected across relay 72 to prevent relay deenergization on sharp voltage dips of short duration which may result from operation of the subsequent circuitry. Deenergization of relay 72 opens contact 72B and deenergizes bypass relay 80 to close contact 80A and directly connect source 10 to load 20.

A capacitor 79 prevents relay 80 from dropping out on voltage dips.

A resistor 76, a diode 77, and a zener diode 78 function in a typical manner to provide potentials required for operation of portions of the circuitry of the system. Zener diode 78 provides a stable DC supply for the circuitry independent of battery voltage fluctuations.

When contact 72B closes, all the subsequent circuitry is connected to the battery through closed contact 41A along conductor 323. A large capacitor 91 is connected across the terminals of the battery to help in reducing the voltage dips during current surges that might otherwise deenergize relay 72.

A third contact 72C is connected across AC source 10 in series with an indicating light 17. Light 17 goes on and stays on if the battery has sufficient voltage to keep relay 72 energized and if the AC source 10 is delivering power. Therefore, light 17 serves as a visual indicator that both the AC voltage source is present and that the battery has a sufficient charge for operation. The light indicates that the system is in normal operation.

Battery 90 furnishes DC power along conductors 318, 323 and 319 to oscillator circuit 100, driver circuit 170, and inverter circuit 160.

Upon being connected to the battery, oscillator circuit 100 immediately begins furnishing the reference signal, a sine wave voltage, along conductors 313 and 314 to voltage comparison circuit 110 at a primary winding 112p of a transformer 112.

In the operation of oscillator circuit 100, transistors 105 and 108 are controlled by their respective R-C circuits of resistor 99 and capacitor 109 and resistor 98 and capacitor 97. The oscillating frequency is principally determined by the reactance of a primary winding 96p of a transformer 96 and the capacitance of a capacitor 104. A capacitor 101 is connected in series with a variable resistor 102 to provide for accurate adjustment of the frequency of the sine wave to slightly above or below the frequency of primary power source 10.

Primary winding 96p of transformer 96 is connected to primary winding 112p of transformer 112. The reactance of the two windings must be taken into account in adjusting the frequency of the oscillator.

The emitters of transistors 105 and 108 are connnected to the positive terminal of the battery through resistors 106 and 107 and resistor 103, conductor 322, diode 77, and resistor 76. By properly selecting the capacitor, reactance, and resistor values in the circuit, the oscillator will produce an output sufficiently accurate in frequency for this particular type of application. Oscillator circuit 100 is locked into synchronization with the alternating current from power source 10 when the AC power source is connected to voltage comparison circuit 110.

The reference signal from oscillator circuit 100, delivered to winding 112p of transformer 112, appears across a secondary winding 112s. The voltage appearing across secondary winding 112s is filtered by a capacitor 117 and rectified by full wave rectifier 116. This voltage appears across a resistor 128 and is shown by curve F in FIG. 6.

A secondary winding 111s of transformer 111 in voltage comparison circuit 110 is connected to source 10 along conductors 311 and 312 and is rectified by full wave rectifier 113 to produce a signal, as shown in curve E in FIG. 6, across resistor 114. A variable resistor 209 is connected to adjust the voltage appearing at resistor 114 so that the two voltages, appearing across resistors 114 and 128, may be appropriately balanced for comparison. In this manner the voltage of source 10 and the reference signal are instantly compared to determine if the AC source voltage has dropped below a predetermined level. The resultant output of the comparison circuit appears as shown in FIG. 7 for the example curves of FIG. 6.

A resistor capacitor network in voltage comparison circuit 110, comprising capacitors 115 and 118 and a resistor 119, serves a dual function. First, it controls the response of secondary winding 112s to the voltage appearing across winding 111s so that it feeds back to oscillator 100 and locks the oscillator output in with the alternating current from source 10. Second, it receives the difference of the voltages across resistors 114 and 128. Resistor 209 is adjusted so that the output from voltage comparison circuit 110, which is delivered along conductors 315 and 316, is positive when the voltage of power source 10 is above a predetermined minimum level. When the power source voltage is below this minimum level the output along conductors 315 and 316 is negative.

This output from voltage comparison circuit 110, positive for normal operation and negative for emergency operation, is supplied to pulse circuit 130. This output is a half cycle pulse output, as shown in FIG. 7. These half cycle pulses are applied to the base of a transistor 221 through a resistor 226 and a diode 225. If the pulses, which appear across resistors 222 and 224, are positive, the positive voltage repeatedly turns on transistor 221. Resistor 224 is primarily a bias resistor providing negative feedback action that helps to improve the transistor small signal response and a resistor 219 provides proper cutoff for transistor 221. A voltage divider formed by series connected resistors 222, 223, and 134 is connected between the positive and negative terminal of the battery along a conductor 321 (through resistor 76) and conductor 323. The turning on of transistor 221 makes the base of a transistor 138 negative across resistors 223 and 134.

Making the base of transistor 138 negative turns it on to pass a positive pulse appearing across a resistor 133, through diode 135 and a resistor 136 to the base of a transistor 239 in output control circuit 120.

In a similar manner, diodes 227 and 131 and transistors 217 and 139 acting with resistors 215, 218, 216 and 132 operate to produce negative pulses which are applied to the base of transistor 239 when the output voltage from voltage comparison circuit 110 is negative.

Thus, during normal operation, pulse circuit 130 supplies positive square wave pulses (FIG. 8) to the base of transistor 239 and during emergency operation pulse circuit 130 supplies negative square wave pulses to the base of transistor 239.

Voltage sensing control circuit 120 comprises a bistable flip-flop circuit of the Schmitt trigger type. The flip-flop circuit is made up of transistor 239 and a transistor 234; resistors 126, 125, 235, 233 and 232; and capacitor 236. A feedback resistor 237 and bias resistor 137 (in circuit 130) are added to improve stability.

The bistable characteristic of the flip-flop circuit in voltage sensing control circuit 120 identically follows the two states of operation of the standby power supply system as indicated by the pulses from pulse circuit 130, that is, it places the system in normal operation when the pulses are positive and places it in emergency operation when the pulses are negative.

When transistor 239 is turned on, it turns off transistor 234 and when transistor 239 is turned off, it turns on transistor 234. Since transistor 239 turns off when it is receiving positive pulses (normal operation) transistor 234 is turned on and a point 325 assumes a potential, which is slightly less positive than the battery positive terminal, across resistor 232 and resistor 76 and a diode 77 (FIG. 3, circuit 70) connected by conductors 315 and 322.

A diode 127, resistor 128 and a resistor 231 are selected to permit a transistor 129 to turn off when transistor 234 is turned on. When transistor 129 is turned off diodes 121 and 122 are connected to a point 327 and to the negative terminal of the battery through a resistor 123 along conductor 323. A series diode circuit 238 and a point 326 are also connected through resistor 126 to the negative terminal of the battery along conductor 323.

When transistor 234 is turned on (normal operation) diode 124 passes positive potential from the battery to the base of a transistor 181 (in driver control circuit 180) to turn it off. This blocks current flow to driver circuit 170. A capacitor 185 is substantially charged through diode 122 across resistor 123. Since transistor 181 is turned off, point 327 becomes negative because resistor 123 is connected to the negative terminal of the battery along conductor 323. The negative charge on capacitor 185 holds driver control circuit 180 and output sensing circuit 140 inoperative because the base of transistor 181 is held to the positive potential through diode 124 and conducting transistor 234 to conductor 322.

Diode 121 controls switch circuit 50. When transistor 129 is turned off (normal operation), diode 121 is reverse biased thereby controlling switch circuit 50.

When the input to pulse circuit 130 from voltage comparison circuit 110 is negative (emergency operation), transistor 217 (circuit 130) receives negative half cycle pulses through diode 227 and is alternately turned on and off. These pulses are amplified by transistor 139 which has its base connected to a voltage divider comprising resistors 218 and 215. When transistor 139 is turned on, a strong negative potential from the negative terminal of the battery along conductor 323 is conducted from the emitter to the collector of transistor 139 through diode 131, resistor 132, and resistor 136 to the base of transistor 239. Voltage sensing control circuit 120 is thereby turned on to change the system to emergency operation.

When transistor 239 receives a negative pulse, it is turned on, transistor 129 is turned on, and transistor 234 is turned off. Transistor 129 turns on because negative potential is supplied to its base from conductor 323 through resistor 125, diode 127 and resistor 128. Diode 121 then passes positive potentia olt a transistor 23 in switch circuit 50. This changes switch circuit 50 from its on to off condition.

Also, diode 122 is now reverse biased and capacitor 185 is released and brought under the control of driver control circuit 180. Diode 124 is also reverse biased making the base of a transistor 181 negative across a resistor 183 by the charge previously built up on capacitor 185. A diode 182 is connected to provide cutoff potential for transistor 181. The negative charge of capacitor 185 is controlled by a transistor 187, resistors 184, 186, 188 and 189 and Zener diode 141 (in output sensing circuit 140) through the operation of output sensing circuit 140.

Output sensing circuit 140 comprises a variable resistor 142, a full wave rectifier 143, a capacitor 144, and a transformer 145 with a primary winding 145p and a secondary winding 145s. Secondary winding 145s is in the output sensing circuit and primary winding 145p is connected through conductors 311' and 312 directly to load 20.

Transistor 181 is turned on by the discharge current from capacitor 185 flowing through resistor 183. Transistor 181 controls driver circuit 170. The AC output of the system is therefore controlled by transistor 181 and can be adjusted to maintain AC output voltage at a constant level at the instant of transfer if constant load conditions prevail or it can be adjusted to produce the maximum available output.

During emergency operation, referring to output control circuit 120, transistor 239 is turned on and diode circuit 238 is connected through transistor 239 to the positive terminal of the battery through resistor 232. The positive terminal is then connected through a resistor 211 to the base of a transistor 228 which is then turned on to supply driver circuit 170 with the necessary negative potential from conductor 323 through conductor 324. This negative potential is utilized for crossover current correction.

Driver circuit 170 comprises a first driver stage and a second driver stage. The first driver stage receives an input from transistor 181 in driver control circuit 180 along conductor 328 and receives another input from oscillator circuit 100 at secondary winding 96s of transformer 96. The first driver stage comprises capacitors 94, 175, 176; resistors 95, 93, 157, 158, 171, 92, 174 and 173; transistors 159 and 172; and a primary winding 177p of a transformer 177. Capacitor 94 is used to balance transformer impedance and therefore improve response time as well as wave form. Capacitors 175 and 176 are used as bypass capacitors for resistors 174 and 173, respectively. Resistors 157 and 158 are utilized for crossover current correction which is partially accomplished at this point in the circuit. The circuit parameters are selected to avoid saturation of transformer 177 and transistors 159 and 172 in order to preserve the sine wave output at its maximum power level.

The second driver stage of driver 170 comprises transistors 207, 208, 213 and 214; resistors 201, 202, 203 and 204; capacitor 178; diode 179, and a secondary winding 177s of transformer 177. Capacitor 178 functions to balance the transformer impedance. Diode 179 is forward biased and limits the negative bias applied to the bases of transistors 207, 208, 213 and 214 to further accomplish crossover current correction by limiting the voltage drop across resistor 202. The transistors of the second driver stage of driver circuit 170 operate as emitter follower amplifiers. The voltage drops across resistors 203 and 204 are applied to the bases of transistors 161 and 168, respectively, in inverter circuit 160.

Inverter circuit 160 comprises transistors 161, 168, 162, 163, 167 and 166; diodes 164 and 165; and resistors 205 and 206. The power transistor arrangement in inverter circuit 160 avoids the use of transformers and provides for excellent stability and speed. Diodes 164 and 165 prevent collector potential reversal of the transistors. The power transistors provide secondary winding 169s of transformer 169 with sine wave voltage and current of a magnitude that furnishes AC power to load 20 at a primary winding 169p.

In the operation of inverter circuit 160 a means for accomplishing crossover current correction is provided. In order to conserve power, the crossover current correction is primarily applied to the second driver stage of driver circuit 170 at the instant the unit is switched to emergency operation. The correction is obtained by applying negative bias to the bases of transistors 207 and 208 and transistors 213 and 214 through transistor 228 along conductor 324, as controlled by diode circuit 238. A resistor 212 is connected to provide proper cutoff for transistor 228 (at normal operation transistor 239 is turned off and diode circuit 238 is reverse biased so that resistor 212 provides negative bias to turn off transistor 228).

When the system switches to emergency operation, switch circuit 50 (FIG. 2) disconnects source 10 from load 20. Switch circuit 50 comprises transformer 21 with primary winding 21p connected in the power line across conductors 311 and 311'. The primary winding is therefore in series with source 10 and load 20 when contact 151c is closed (normal operation). The transformer is designed so that a secondary winding 21s passes very little current through the primary winding when it is opened, that is, it functions like a simple series reactor with relatively high reactance. In normal operation winding 21s is short circuited by a pair of back to back power transistors 18 and 39 with collector resistors 25 and 38 and diodes 48 and 37. Capacitors 19 and 26 are used as coupling capacitors. Diodes 48 and 37 prevent reversal of transistor collector voltage which may have a damaging effect on the transistors.

The base of each of power transistors 18 and 39 is respectively connected by resistors 27 and 28 to a typical two stage amplifier comprising transistor 23, a transistor 22, a diode 24, a resistor 16 and a resistor 15.

Base control current for power transistors 18 and 39 is obtained from secondary winding 21s of transformer 21 and from a secondary winding 47s of a transformer 47. A diode 45, a diode 46, and a capacitor 44 complete the power source. Diodes 42 and 43 are steering diodes which direct the current to the proper transistor alternately each half cycle. When diode 121, in output control circuit 120, is reverse biased (normal operation), resistor 15, connected between the base and collector of transistor 23, turns on control circuit 50 by making transistor 22 conductive.

When transistor 22 is conducting, transistors 18 and 39 are also conductive. The low impedance of the short circuited secondary winding 21s is reflected in the primary winding which carries the load current with only a very few volts drop between conductors 311 and 311'.

When the power source fails, diode 121 (pulse circuit 130) no longer reverse biases transistor 23 (switch circuit 50). Transistor 23 is then turned off and this stops the operation of transistors 18 and 39 thereby removing the short circuit across secondary winding 21s. This creates a large impedance in transformer 21 which appears in primary winding 21p and prevents current flow from source 10 to load 20.

When the AC power source fails, AC power is produced by inverter circuit 160 at primary winding 169p of transformer 169 and delivered along conductors 311' and 312 to load 20. Also, relay circuit 30 responds to the power failure and its control relay 31 is deenergized to open its contacts 31A, 31B and 31C thereby completing the changeover to emergency operation.

If normal power is restored the system will automatically return to normal operation and commence charging battery 90 and return to standby status ready for emergency operation if the power should again fail.

Upon restoration of AC power, relay 31 is energized and its contact 31B (synchronizing circuit 150) reconnects relay 151 to secondary winding 169s of transformer 169. Since primary winding 169p is connected to load 20, and a primary winding 155p of transformer 155 is connected to power source 10, relay 151 is exposed to the instantaneous sum or differences of the two AC voltages appearing at the secondary windings 169s and 155s. Resistor 152 is adjusted so that relay 151 is activated when full wave rectifier 154 delivers a predetermined voltage. This predetermined voltage is selected as the maximum voltage that occurs when the voltage of source 10, appearing at secondary winding 155s, and the AC produced at secondary winding 169s, from inverter circuit 160, are in phase. Since the output of inverter circuit 160 is of a slightly different frequency than the AC source, normal operation is obtained only at the instant that maximum voltage is obtained and the two AC sources are in phase. Capacitor 153 provides a small time delay to give relay 151 more positive action at the point of synchronization.

When the two voltages are in phase, relay 151 is activated and its contact 151B closes to energize timing relay 41 which in turn closes contact 41A to activate relay 80 and open contact 80A and place switch circuit 50 in the power line through contact 151C which is also closed. Contact 151A opens and activates control relay 31, and contact 151D reconnects primary winding 111p of transformer 111 to voltage source 10 thereby providing voltage comparison circuit 110 with voltage from winding 111s. The output voltage of voltage comparison circuit 110 then goes from negative to positive and the circuit then operates in a normal condition as previously described.

Figure 1:
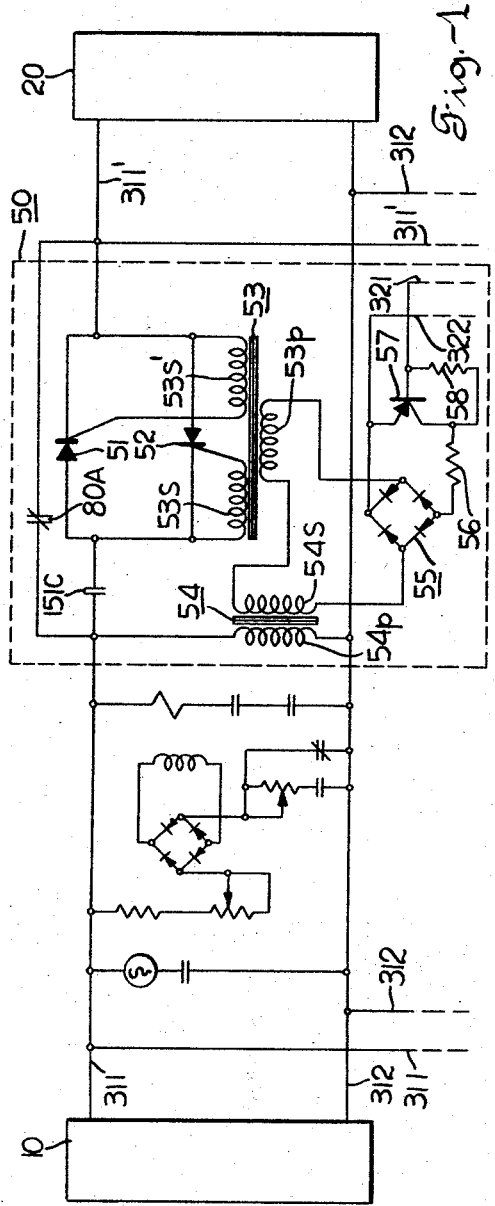
FIG. 1 is a schematic drawing of an embodiment of a portion of a circuit embodying this invention.

Switch circuit 50 shown as FIG. 2, may be replaced by a circuit 50' shown as FIG. 1. This circuitry functions to disconnect power source 10 from load 20 as does control switch circuit 50.

Referring to FIG. 1, during normal operation a primary winding 54p of transformer 54 is connected to power source 10 and a secondary winding 54s is connected in series with a full wave rectifier 55, a resistor 56, a transistor 57 and a primary winding 53p of a transformer 53. A resistor 58 is connected to keep transistor 57 turned on so that current is flowing through primary winding 53p. Silicon controlled rectifiers 51 and 52 are alternately turned on each half cycle by the output voltage across secondary windings 53s and 53s' of transformer 53.

During emergency operation the base of transistor 57 receives a positive signal from voltage sensing control circuit 120, as explained previously, when the reverse biasing of diode 121 in output control circuit 120 is removed. Transistor 57 is then turned off. On failure of the normal power source and production of AC power from the inverter circuit, current flowing through the SCR that is momentarily conducting instantly reverses and power will cease to flow across circuit 50'. The SCR is not turned on again until transformer 53 is energized by transistor 57 when voltage sensing control circuit 120 returns to normal operation to reverse bias diode 121.

In describing the invention the preferred embodiment has been shown and described but it is obvious to one skilled in the art that there are many variations, combinations, alterations, and modifications that may be made without departing from the spirit of the invention, or from the scope of the appended claims.

The embodiments of the invention in which an exclusive property or privilege is claimed are defined as follows:

1. In a standby power supply system for producing AC power for a load upon failure of a primary AC power source, means for sensing the level of said AC power source to effect disconnection of the primary AC source from the load and energization of the load from a standby power supply, said means comprising:

means for producing an alternating reference signal of preselected amplitude and wave shape having a preselected relationship to the amplitude and wave shape of the AC power source, means connected to the primary AC source and connected to receive the reference signal for producing a comparison output indicating the instantaneous relative amplitudes of the primary AC source and the reference signal, and means responsive to the comparison output for energizing the load from the standby power source when the comparison output deviates from a preselected level.

2. In a standby power supply system for producing AC power for a load upon failure of a primary AC power source, means for sensing the level of said AC power source to effect disconnection of the primary AC source from the load and energization of the load from a standby power supply, said means comprising:

means for producing an alternating reference signal of preselected amplitude and wave shape having a preselected relationship to the amplitude and wave shape of the AC power source, means connected to the AC source for producing a first output varying as a function of the AC source, means connected to receive the reference signal for producing a second output varying as a function of the reference signal, means connected to receive the first and second outputs for producing a comparison output indicating the instantaneous relative amplitudes of said two outputs, means responsive to the comparison output for producing a control signal when said instantaneous comparison output deviates from a preselected instantaneous value, and means responsive to the control signal for disconnecting the primary AC source from the load and for energizing the load from a standby power supply.

3. Means for sensing the AC power level according to claim 2 also comprising means for reconnecting the primary AC source to a load when the load is energized by the standby power supply and the primary AC source rises above a preselected level and wherein the means for reconnecting comprises means for maintaining the frequency of the AC power produced from the standby power supply at a slightly different frequency than the primary AC source, and means connected to receive a measure of the primary AC source and a measure of the AC power produced from the standby power supply responsive to the level of the two measures to effect energization by the primary AC source when the primary AC source and the AC power produced from the standby power supply are substantially in phase.

4. In a standby AC power supply system for supplying an AC load from a DC source upon failure of a primary AC power source, said system having static output means for producing AC for the load when energized by the DC source, means for sensing the level of the primary AC source to selectively energizing the AC load from the primary AC power source and the static output means comprising:

an oscillator having a natural frequency slightly different from the frequency of the normal AC source producing a sine wave output of a preselected constant amplitude;

voltage comparison means connected to receive a measure of the primary AC power source and a measure of the oscillator output for producing a comparison output indicating the instantaneous relative amplitude of the AC source and the oscillator output, and for feeding back a measure of the primary AC power source to the oscillator to maintain the oscillator at the same frequency and in phase with the normal AC source when the load is supplied from the primary AC power source; and means responsive to the comparison output for energizing the AC load from the static output means when the instantaneous amplitude of the comparison output is less than a preselected level.

5. Means for sensing the level of the primary power source according to claim 4 also comprising means for reconnecting the primary AC source to the AC load when the load is energized by the static output means and the primary AC source rises above a preselected level and wherein the means for reconnecting comprises means connected to receive a measure of the primary AC source and a measure of the output of the static output means responsive to the instantaneous level of the two measures to effect energization by the primary AC source when the instantaneous level of the two measures attains a preselected level.

6. In a standby AC power supply system for producing AC power for an AC load from a DC source upon failure of a primary AC power source normally supplying the load, means for sensing the level of the primary AC power source to produce a control signal for effecting switching to the standby power supply, said means comprising:

reference signal means for producing an AC reference signal of preselected amplitude and having a frequency slightly different from the frequency of the primary AC source, voltage comparison means connected to receive the AC power source output and connected to the reference signal means for controlling the reference signal means to keep the reference signal means in phase with and at the same frequency as the AC power source and for converting a measure of the power source output and a measure of the reference signal, respectively, to half cycle unidirectional pulses of opposite polarity, means for receiving the half cycle pulses to produce a comparison output varying as the instantaneous function of the half cycle pulses, means responsive to a predetermined instantaneous comparison output level to produce the control signal, said control signal having one polarity when the comparison output is above a preselected level and an opposite polarity when said comparison output is below said preselected level, and means responsive to the polarity of the control signal for disconnecting the primary AC source from the load and for energizing the load from the standby power supply.

7. In a standby AC power supply system for supplying an AC load from a DC source upon failure of a primary AC power source and for energizing the AC load from the primary AC source upon recovery of the primary AC source, said system having static output means for producing AC for the load when energized by the DC source and having means for sensing the level of said AC power source to effect disconnection of the primary AC power source from the load and energization of the load from a standby power supply, said means comprising:

an oscillator having a natural frequency slightly different from the frequency of the primary AC source producing a sine wave output of constant preselected amplitude, said oscillator connected to control the static output means to maintain the static output means ouput in phase with and equal in frequency to the oscillator output;

a voltage comparison circuit connected to receive a measure of the primary AC source and a measure of the oscillator output for producing an output indicating the instantaneous relative amplitude of the primary AC source and the oscillator output, said comparison circuit connected to feed back a measure of the primary AC source to the oscillator to maintain the frequency of the oscillator equal to and in phase with the primary AC source; and means for selectively energizing the static output means from the DC source to supply the AC load and disconnecting the primary AC source from the load, and for deenergizing the static output means and connecting the primary AC source to the load in response to the comparison circuit output.

8. In a standby AC power supply system for energizing an AC load from a DC source upon failure of a primary AC power source and for energizing the AC load from the primary AC source upon recovery of the primary AC source, said system having static output means for producing AC for the load when energized by the DC source and means for sensing the level of the AC power source to effect disconnection of the primary AC source from the load and energization of the load from a standby power supply, said means comprising:

an oscillator having a natural frequency slightly different from the frequency of the AC source producing a sine wave output of constant amplitude, said oscillator connected to control the static output means to maintain the static output means output in phase with and equal in frequency to the oscillator output;

a voltage comparison circuit connected to receive a measure of the primary AC source and a measure of the oscillator output for producing a comparison output indicating the instantaneous relative amplitude of the AC source and the oscillator output, said comparison circuit connected to feed back a measure of the primary AC source to the oscillator to maintain the frequency of the oscillator equal to and in phase with the primary AC source; and means effective when the load is energized by the primary AC source responsive to the comparison output for energizing the AC load from the static output means and for disconnecting the primary AC source from the comparison circuit and from the load when the comparison output indicates that the primary AC source drops below a predetermined instantaneous minimum level, and means effective when the load is energized by the static output means responsive to the primary AC source and to the static output means output for connecting the primary AC source to the load when the static output means output and the primary AC source are in phase, for connecting the primary AC source to the comparison circuit, and for deenergizing the static output means when the primary AC source becomes greater than a predetermined level.

9. A standby AC power supply system connected to a primary AC power source, to a battery, and to a load, said system having static output means for producing AC power for the load from the battery and having control means, said control means comprising:

an oscillator producing a sine wave output of constant voltage at a frequency slightly different from the frequency of the AC power source, said oscillator connected to control the static output means frequency;

a first transformer with a primary winding connected across the primary AC power source;

a second transformer with a primary winding connected to receive the oscillator output;

each of said transformers having a secondary winding with said secondary windings connected to each other through rectifying circuits and adjusting circuits to produce a comparison output equal to the difference between the outputs appearing at said secondary windings;

reference phasing control means connecting the primary AC power source to the oscillator to maintain the frequency of the oscillator equal to and in phase with the primary AC power source; and means connected to receive the comparison output to connect the battery to the static output means and disconnect the primary AC power source from the load, from the reference phasing control means, and from the primary winding of the first transformer when the comparison output indicates that the output of the second transformer secondary winding is greater than the output of the first transformer secondary winding.

10. A system according to claim 9 also comprising means effective when the load is energized from the static output means connected to receive a measure of the primary AC source and the static output means output for disconnecting the battery from the static output means and for connecting the primary AC source to the load, to the reference phasing control means, and to the primary winding of the first transformer when the primary AC source output is greater than a predetermined level and the primary AC source and the static output means output are in phase.

11. In a standby AC power supply system for supplying an AC load from an inverter energized by a DC source upon failure of a primary AC source and for energizing the AC load from the primary AC source upon recovery of the primary AC source;

an oscillator having an output transformer with a primary and secondary winding, said oscillator having a natural frequency slightly different from the frequency of the primary AC source and producing a sine wave of constant amplitude across said primary winding;

said inverter connected to the secondary winding of said output transformer and controlled by the oscillator output to maintain the inverter output in phase with and at the same frequency as the oscillator output;

a voltage comparison circuit having a first transformer with a primary and secondary winding connected to receive the primary AC source across the primary winding and a second transformer with a primary and secondary winding having the primary winding connected in parallel with the primary winding of the oscillator output transformer;

a potentiometer with a center tap connected across the first transformer secondary winding;

a first full wave rectifier with a pair of input terminals and a pair of output terminals having one input terminal connected to one end of the potentiometer and the other input terminal connected to the tap of the potentiometer;

a resistance connected between the output terminals of the first rectifier;

a second full wave rectifier with an input side and a pair of output terminals having said input side connected across the secondary winding of the second transformer;

a resistance connected between the output terminals of the second rectifier;

said first rectifier having one output terminal connected to the one output terminal of the second rectifier of the same polarity;

a capacitor connected between the other output terminals of the rectifiers;

means responsive to one polarity of the potential appearing across the capacitor to produce a first signal and responsive to the other polarity of the potential across the capacitor to produce a second signal;

means responsive to the first signal to energize the inverter, to disconnect the primary AC source from the load, and to disconnect the primary AC source from the primary winding of the first transformer;

means responsive to the second signal to connect the primary AC source to the load and to deenergize the inverter; and means effective when the load is energized by the inverter for connecting the primary AC source to the primary winding of the first transformer when the primary AC source and inverter output are momentarily in phase upon recovery of the primary AC source.

References Cited
UNITED STATES PATENTS

| | | | |
|---|---|---|---|
| 1,951,482 | 3/1934 | Holden | 307—64 |
| 3,201,592 | 8/1965 | Reinert | 307—64 |
| 3,229,111 | 1/1966 | Schumacher | 307—64 |

ORIS L. RADER, *Primary Examiner.*

T. J. ADDEN, *Assistant Examiner.*